United States Patent [19]
Talley et al.

[11] Patent Number: 5,161,361
[45] Date of Patent: Nov. 10, 1992

[54] MOTOR-DRIVEN SPINDLE ASSEMBLY FOR RING SPINNING

[75] Inventors: Perry E. Talley, Easley; Michael P. DeKoning, Piedmont; Richard N. Ryer, II, Easley, all of S.C.

[73] Assignee: Platt Saco Lowell Corporation, Greenville, S.C.

[21] Appl. No.: 752,377

[22] Filed: Aug. 30, 1991

[51] Int. Cl.$^5$ .............................................. D01H 1/244
[52] U.S. Cl. ......................................... 57/264; 57/100; 57/129; 310/68 B; 310/DIG. 3
[58] Field of Search ................... 57/75, 100, 129, 134, 57/135, 264; 310/68 B, DIG. 3

[56] References Cited

U.S. PATENT DOCUMENTS

| | | | |
|---|---|---|---|
| 3,742,268 | 6/1973 | Volkrodt | 57/100 X |
| 4,833,873 | 5/1989 | Kobayashi et al. | 57/100 |
| 4,952,830 | 8/1990 | Shirakawa | 310/DIG. 3 X |
| 4,968,913 | 11/1990 | Sakamoto | 310/68 B X |
| 5,045,740 | 9/1991 | Hishinuma | 310/68 B X |

FOREIGN PATENT DOCUMENTS

| | | |
|---|---|---|
| 355557 | 2/1990 | European Pat. Off. ........... 57/100 |
| 229458A | 9/1990 | United Kingdom . |
| 2229457A | 9/1990 | United Kingdom . |

OTHER PUBLICATIONS

Suessen-Novibra Technical Information document entitled, "HP-S Spindle Bearing" (publication date unknown).

Primary Examiner—Joseph J. Hail, III
Attorney, Agent, or Firm—Luke J. Wilburn, Jr.

[57] ABSTRACT

A brushless DC motor-driven spindle assembly for a textile ring spinning frame wherein a shaft for rotatably supporting a bobbin for yarn collection is mounted for rotation about a central axis of rotation in a bolster section and, under certain conditions of operation, for rotation about axes which are incrementally angularly displaced from the central axis of rotation, and including rotor/stator position detecting elements comprising sensed elements mounted on the motor rotor for rotation therewith and sensing elements mounted in fixed position relative to the rotor and adjacent the path of movement of the sensed elements so as to maintain the same radial distance between the sensing elements and the sensed elements during incremental angular displacement of the axis of rotation of the shaft and motor rotor. In a preferred embodiment, the sensed elements may be a magnetic ring mounted on the rotor and having alternating North and South pole sections, and the sensing elements may be Hall effect sensors mounted in fixed position on a portion of the bolster section to correspondingly move with the incremental angular displacement of the rotational axis of the bobbin support shaft of the spindle assembly.

5 Claims, 11 Drawing Sheets

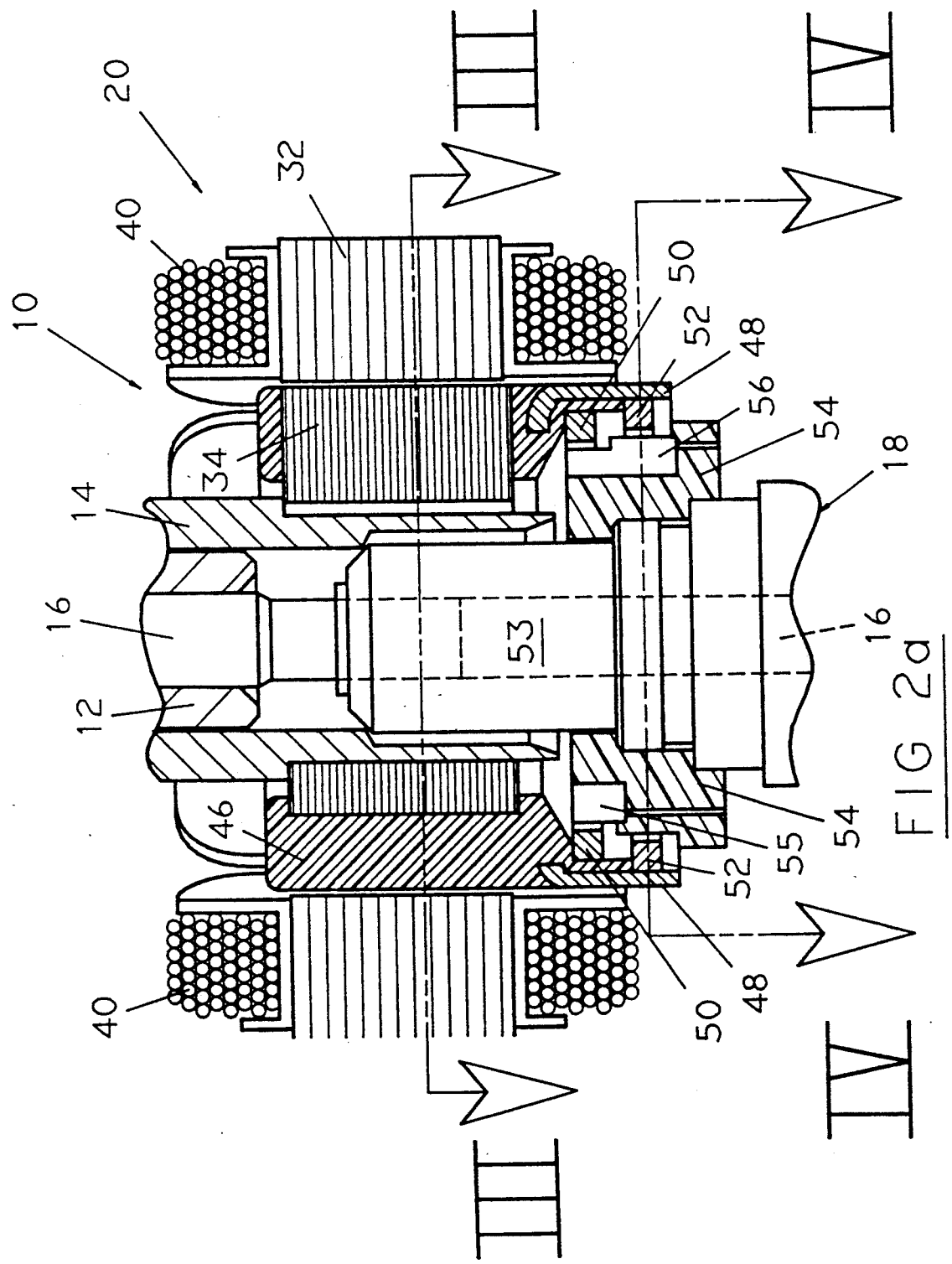

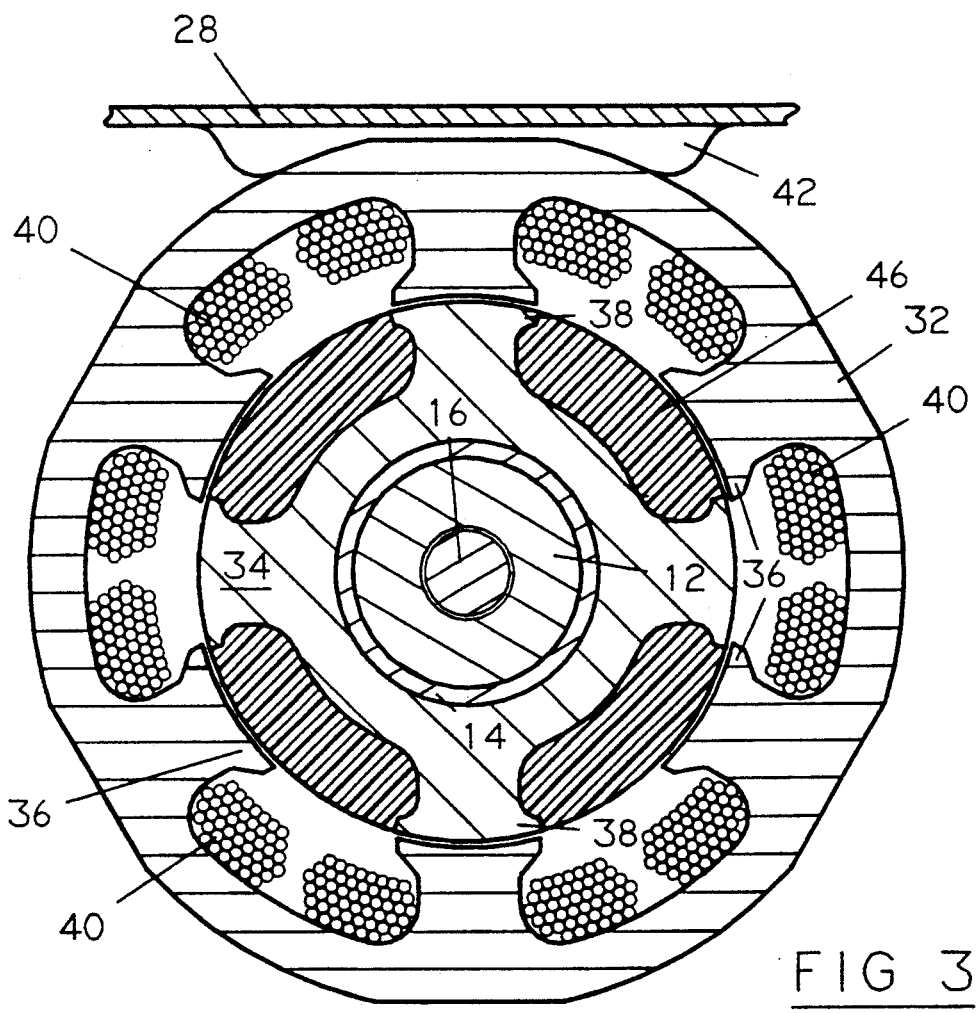

MOTOR-DRIVEN SPINDLE ASSEMBLY FOR RING SPINNING

The present invention is directed to an improved motor-driven spindle assembly for a textile ring spinning frame, and, more particularly, to a variable reluctance motor-driven spindle assembly having improved means for providing signals during operation of the motor to indicate the relative positions of the rotor and stator components thereof.

BACKGROUND OF THE INVENTION

Brushless DC motors without permanent magnets often are interchangeably referred to as switched reluctance (SR) or variable reluctance (VR) motors. Reference to a VR motor herein is intended to include both terminologies. A VR motor has two sets of salient poles, one set on the stator which has phase windings around the poles and another set on the rotor which has no windings. The stator phase windings are sequentially energized with current pulses to rotate the rotor which is connected to a shaft output. The stator phase windings are sequenced, or commutated, by signals from a rotor position sensor. The rotor position sensing means may comprise optical sensors or magnetic sensors of the Hall effect type. The sensors typically are mounted in fixed position on the stator or motor housing adjacent the path of rotation of the rotor, and the sensed means are fixed for rotation with the rotor.

In a typical three-phase, VR motor, three Hall effect sensors may be located 120° arcuately apart, centered about the rotor shaft, and are fixed either directly to the stator or to some fixture which locates them according to some known relationship with respect to the stator. A magnetic ring with four North regions and four South regions alternating in 45° radial arcs of the ring are attached to the rotor or rotor shaft and serve as sensed means so that when the rotor rotates, sensor output signals can be used to directly commutate, i.e., cut on and off, the current to each of the motor phase windings as they locate each and every pole alignment.

VR motors have been proposed for driving the individual spindle assemblies of a textile yarn ring spinning frame. In such spindle assemblies, the rotor of the motor is mounted on the spindle shaft which supportably rotates a yarn collection member, such as a bobbin, during the spinning operation. A ring rail with ring and traveler reciprocates vertically along the support bobbin to wind the yarn package. The lower end of the spindle support shaft is supported for rotation in a bolster section which has an outer housing mounted in fixed position to a spindle assembly support rail of the spinning frame. The stator of the VR motor is disposed in surrounding relation to the rotor and is mounted in fixed position in a housing supportably attached in suitable manner to the bolster housing or support rail of the ring spinning frame.

In certain conditions of operation during the ring spinning process, such as at high rotational speeds and in cases of unbalanced yarn package build, it is desirable to permit the support shaft to be angularly displaced slightly from its central axis of rotation to dampen vibration and prevent mechanical resonance. To permit such angular displacement of the yarn package support shaft from its central axis of rotation, the lower end portion of the shaft may be supported for rotation in a non-rotating sleeve member located inside the bolster housing, which sleeve member is attached to the bolster housing to permit its slight angular displacement during shaft rotation. The bolster housing around the sleeve is packed with a damping agent, such as grease.

During such periods of incremental angular displacement of the rotating support shaft of the spindle assembly, the rotor moves radially relative to the stator. It can be appreciated that the radial distances between the sensed elements located on the rotor and the sensing element located on the stator or stator housing will accordingly vary with such displacement, resulting in improper or irregular signals being transmitted to indicate relative positions of the rotor and stator components. Particularly, in use of magnetic detection means, variations in the radial distance between the sensed means and the sensing means can produce magnetic field strength variations, causing inaccurate detection and improper signal information for control of the operation of the motor.

BRIEF OBJECTS OF THE PRESENT INVENTION

It is, therefore, an object of the present invention to provide an individual motor-driven spindle assembly for a textile ring spinning frame having improved means for ensuring correct position and location of the sensing elements and the sensed elements employed to detect rotor/stator positions of the motor during spinning operations.

It is a more specific object to provide an individual VR motor-driven spindle assembly having improved means for mounting the sensing elements relative to the sensed elements of the motor/stator detection system whereby incremental angular displacement of the yarn package support shaft of the spindle assembly does not vary the radial distance or relative location of the sensing means from the sensed means.

BRIEF DESCRIPTION OF THE DRAWINGS

The above listed objects as well as other objects of the present invention will become more apparent and the invention will be better understood from the following detailed description of preferred embodiments of the invention, when taken together with the accompanying drawings, in which:

FIG. 2a is an enlarged view of a central portion of the vertical section view of the spindle assembly seen in FIG. 2;

FIG. 3 is a horizontal cross-sectional view of the spindle assembly, taken generally along Line III—III of FIG. 2a and looking in the direction of the arrows;

SUMMARY OF THE INVENTION

The present invention is directed to a brushless DC motor driven spindle assembly for a textile ring spinning frame wherein the shaft means for rotatably supporting a bobbin for the collection of yarn thereon is mounted for rotation about a central axis of rotation in a bolster section and, under certain conditions of operation, for rotation about axes which are incrementally angularly displaced from the central axis of rotation, and wherein the rotor/stator position detecting means includes sensed means mounted on the rotor for rotation therewith and sensing means mounted in fixed position relative to the rotor and adjacent the path of movement of the sensed means so as to maintain the same radial distance between the sensing means and the sensed means during incremental angularly displacement of the axis of rotation of the spindle and rotor.

More specifically, the detection means may comprise alternating North/South pole magnetic rings mounted on the rotor, and Hall effect sensors mounted in fixed position on a portion of the bolster assembly to correspondingly move with the incremental angular displacement of the rotational axis of the rotor and bobbin support shaft of the spindle assembly, thereby at all times maintaining the same radial distance between the sensing means and the sensed means during rotation of the shaft and yarn package build on the bobbin.

DETAILED DESCRIPTION OF PREFERRED EMBODIMENTS

Figure 1:
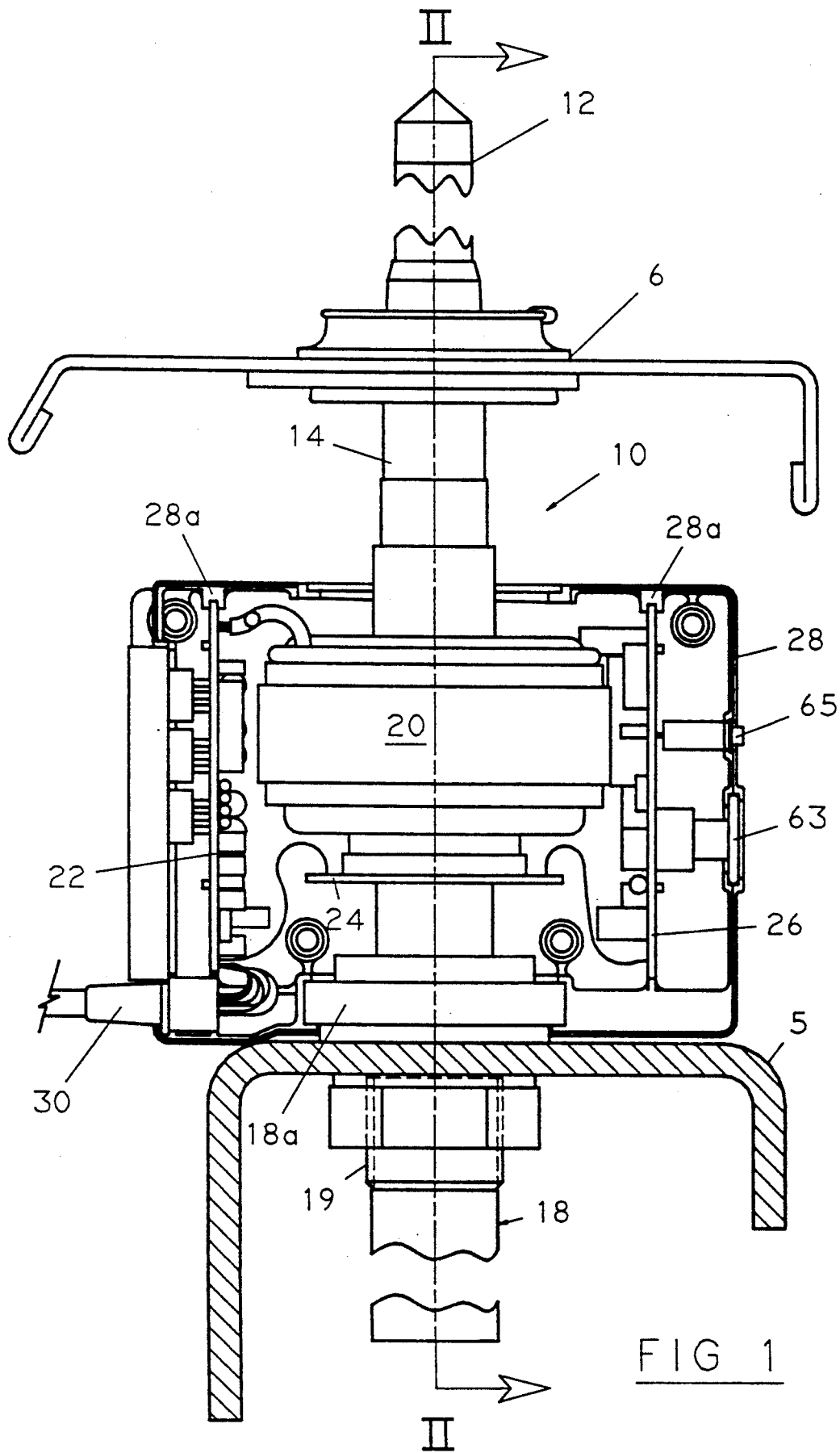
FIG. 1 is an elevation view of a motor-driven spindle assembly of a textile ring spinning frame, with a side cover plate of the spindle motor housing removed to show the motor and motor control circuit boards located in the housing.

Referring more particularly to the drawings, FIG. 1 is an elevation view of a motor-driven spindle assembly 10, such as may be employed at each winding position on a textile ring spinning frame. Such a spinning frame is schematically illustrated in FIG. 1 and includes a support member 5 of a ring spinning frame, and a vertically reciprocatable ring rail, ring, and traveler 6.

Figure 2:
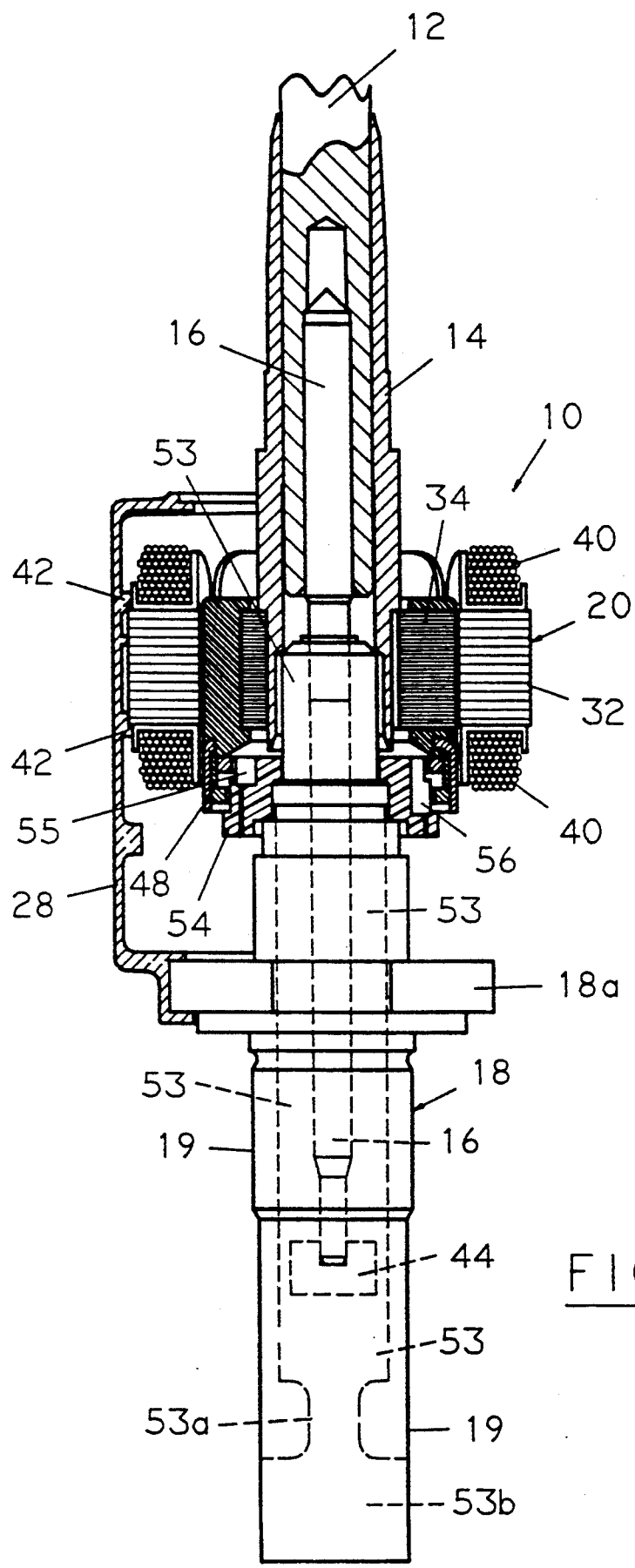
FIG. 2 is a left side, partial elevation view of the motor-driven spindle assembly as seen in FIG. 1, with portions of the spinning frame elements, motor housing, and the circuit boards removed, and with portions of the motor and housing shown in vertical section taken generally along Line II—II of FIG. 1.

As shown in FIGS. 1, 2, and 2a, the spindle assembly 10, portions of which have been removed for convenience, includes yarn package-receiving means comprising shaft means including a sheath 12, a rotor sleeve 14, and a spindle blade 16 mounted for rotation in a supporting bolster section 18. Bolster section 18 includes an outer housing 19 which is mounted in fixed position on horizontal support member 5 of a spinning frame. Surrounding the rotational axis of the spindle assembly are the conventional ring rail package builder 6 and shaft means drive means which includes a VR motor 20. Motor 20, and motor control means, the components of which are mounted on electrically connected electronic circuit boards 22, 24, and 26, are located in a protective housing 28 which is supportably attached in fixed position to a flange portion 18a of the bolster section.

As seen in FIG. 1, circuit boards 22 and 26 are supportably mounted in trackways 28a of the housing and circuit board 24 is supportably mounted on an upper end portion of bolster section 18 in spaced relation to the lower end of motor 20. The motor and motor control system components located on the circuit boards receive power and further control signals from a power supply and a master controller for the ring spinning frame (not shown), through a power and communication supply line 30.

FIG. 2 is a left side elevation view of the spindle assembly of FIG. 1, with circuit boards and portions of the motor housing removed. Portions of the motor 20, sheath 12, and rotor sleeve 14 are shown in vertical section. Referring to FIGS. 2, 2a, and 3, the VR motor 20 comprises a stator 32 and rotor 34. Stator 32 is composed of laminated sheets of steel and has six salient inwardly facing poles 36. Rotor 34 is composed of laminated steel sheets and has four outwardly facing salient poles 38 (FIG. 3). Stator poles 36 are provided with phase windings 40, with radially opposed pairs of salient stator poles being wound in series to form a three-phase motor. The phase windings of the stator are sequentially energized with current pulses to create a magnetic field and attract the rotor poles adjacent thereto, causing rotation of the rotor, rotor sleeve, and sheath.

As best seen in FIGS. 2 and 3, the stator is supported in fixed position in the motor housing 28 on inwardly protruding stator support ledges 42 of the housing. Rotor 34 of the motor is supportably mounted for rotation inside the stator through its fixed attachment to rotor sleeve 14 which is fixed for rotation with the sheath 12. Sheath 12 is in turn fixed for rotation with blade 16, the lower end which is supported for rotation in a bearing cup 44 located in a lower portion of bolster section 18.

Spaces between salient rotor poles are filled with nylon plastic material 46 (FIGS. 2a and 3) in which a metal ring 48 is supportably embedded for rotation with rotor 34. Adhesively secured within metal ring 48 are upper and lower magnetic rings 50, 52. Magnetic rings 50, 52 thus rotate with rotor 34 about the central longitudinal axis of the spindle assembly during motor operation.

Figure 4:
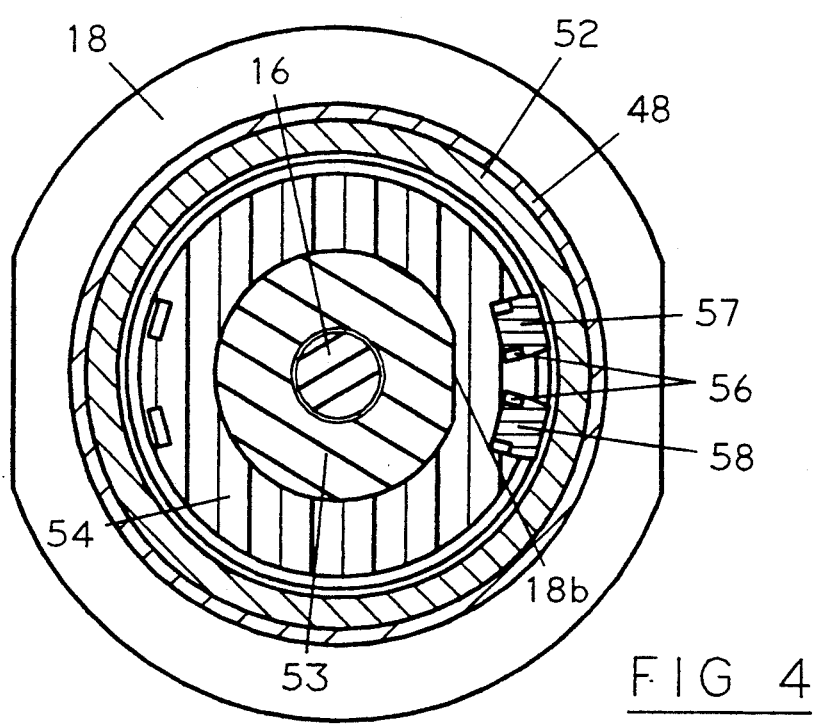
FIG. 4 is a horizontal cross-sectional view of the spindle assembly, taken generally along Line IV—IV of FIG. 2a and looking in the direction of the arrows.

Fixedly mounted to an upper end portion of an internal sleeve member 53 of bolster section 18 is a molded plastic ring 54 which serves to support sensing means which operate in conjunction with the rotating magnetic rings 50, 52 to provide signal information for velocity control and commutation of the motor phase windings, respectively. Support ring 54 is positively fixed in its angular position surrounding an upper end portion of sleeve member 53 of bolster section 18 by mating, flattened sections, seen at 18b, on the sleeve member 53 and ring 54 (FIG. 4). Located in vertically spaced, horizontal planes in support ring 54 are arcuately disposed pairs of pockets 55, 56 (one of each pair seen in FIG. 2a). Each of the two pairs of pockets receive and positively fix the position of sensing means, such as conventional, latched Hall effect sensors, on sleeve 53. Two Hall effect sensors (not shown in pockets in FIG. 2a) are located in two 30° arcuately spaced pockets 55 adjacent the upper magnetic ring 50 for velocity sensing. Two Hall effect sensors 57, 58 (FIG. 4) are correspondingly located in 30° arcuately spaced pockets 56 adjacent the lower magnetic ring 52 to sense the passage of alternating magnetic poles of ring 52 for commutation of the motor phase windings. (See FIGS. 2a, 4, and 5).

Sleeve member 53, as best seen in FIG. 2, has a thin solid section 53a and an enlarged bottom portion 53b fixedly attached to the bolster housing 19. The bolster section 18 between housing 19 and sleeve member 53 is packed with a suitable damping agent, such as grease. The sleeve member 53 is thus fixed against axial rotation in the bolster housing 19, but, through thin section 53a, is flexibly mounted thereto so as to permit its incremental angular displacement from the central axis of the housing and from the central rotational axis of the yarn package support shaft members 12, 14, and 16.

This permits the yarn package support shaft to be angularly displaced slightly from its central axis of rotation to dampen vibration and prevent mechanical resonance during yarn winding operations.

Figure 5:
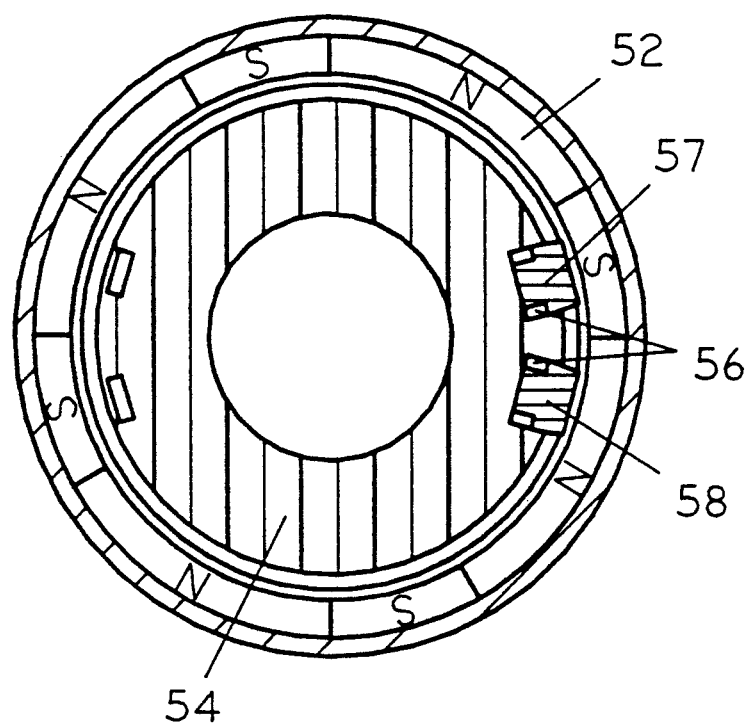
FIG. 5 is a schematic representation of the spindle assembly, as seen in FIG. 4, illustrating the positional arrangement of the means for determining rotor/stator positions of the motor for commutation of the motor.

FIGS. 4 and 5, which are cross-sectional and schematic views taken generally along line IV—IV of FIG. 2, show the rotor/stator position detection means which provide signal information for commutation of the phase windings of the three-phase motor 20. As illustrated in FIG. 5, magnetic ring 52 which is mounted for rotation with rotor 34 has alternating North and South poles of unequal arcuate pole lengths, i.e., 60° and 30°, throughout the 360° extent of the ring. During rotor rotation, the passage of the alternating poles of unequal length are sensed by the two arcuately spaced Hall effect sensors 57, 58 which are fixed against rotation in sensor support ring 54 attached to bolster sleeve insert 53. Sensors 57, 58 are arcuately spaced 30° apart, adjacent the path of rotation of magnetic ring 52.

Details of the use of a magnetic ring having unequal alternating North and South poles to permit commutation of a three phase VR motor by the use of only two arcuately spaced sensors form the subject matter of commonly assigned, co-pending application entitled "Improved Apparatus for Commutation of an Electric Motor", Ser. No. 07/752,734 filed on Aug. 30, 1991.

Figure 6:
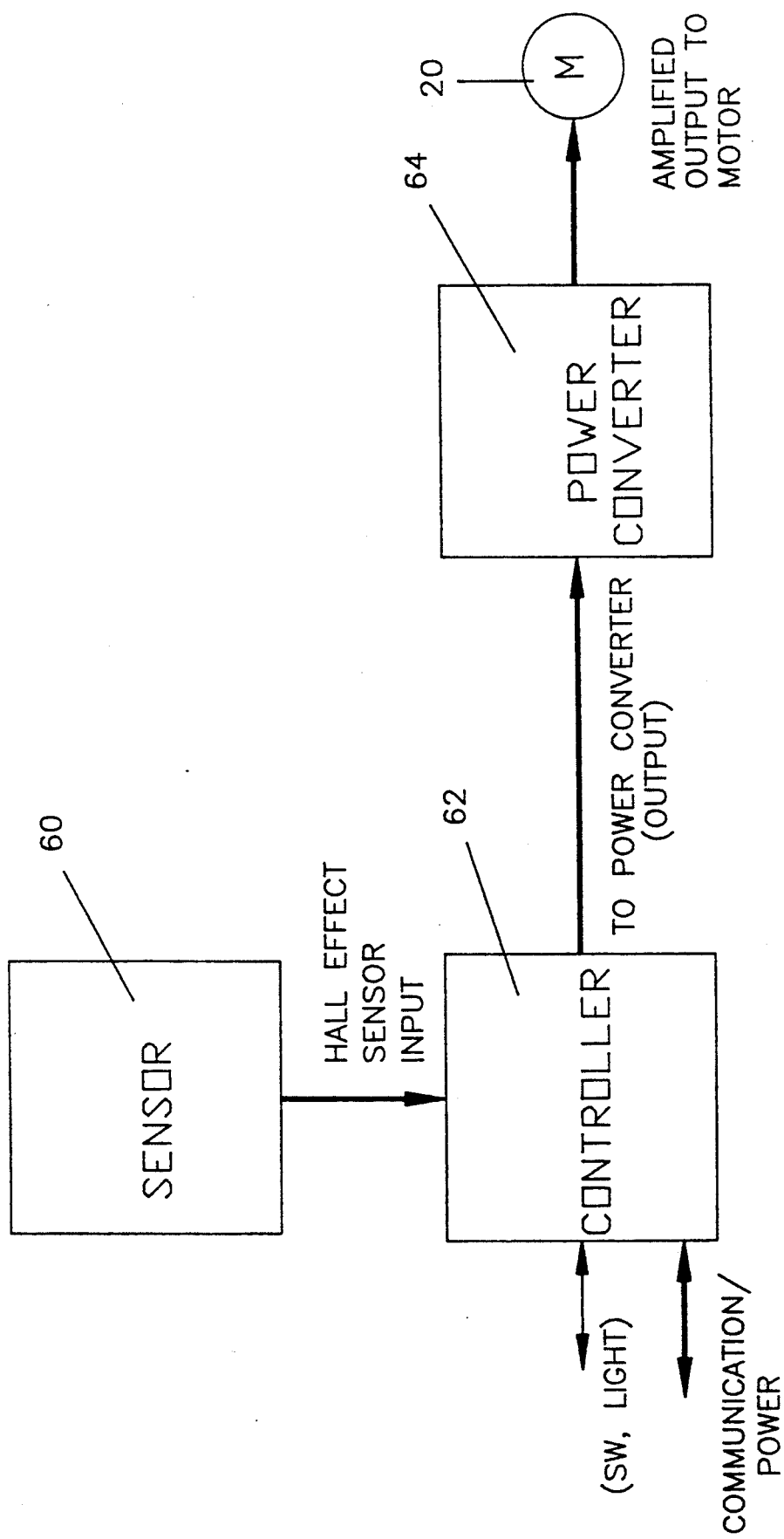
FIG. 6 is an illustrative block diagram showing principal sections of the motor control system of the present invention.

The closed loop motor control system for operating VR motor 20 may best be described and understood by reference to FIGS. 6 through 9 of the drawings which are block diagrams illustrating operative interconnection of the major sections and components of the control system. As seen in FIG. 6, the control system principally comprises three sections, a sensor section 60 for sensing rotor velocity and stator/rotor position of the motor, a controller section 62, and an amplifier, or power converter, section 64. The component parts of sensor section 60 are located conveniently on circuit board 24, as seen in FIG. 1. Controller section 62 component parts are located conveniently on circuit board 26, and component parts of power converter section 64 are located on circuit board 22.

Figure 7:
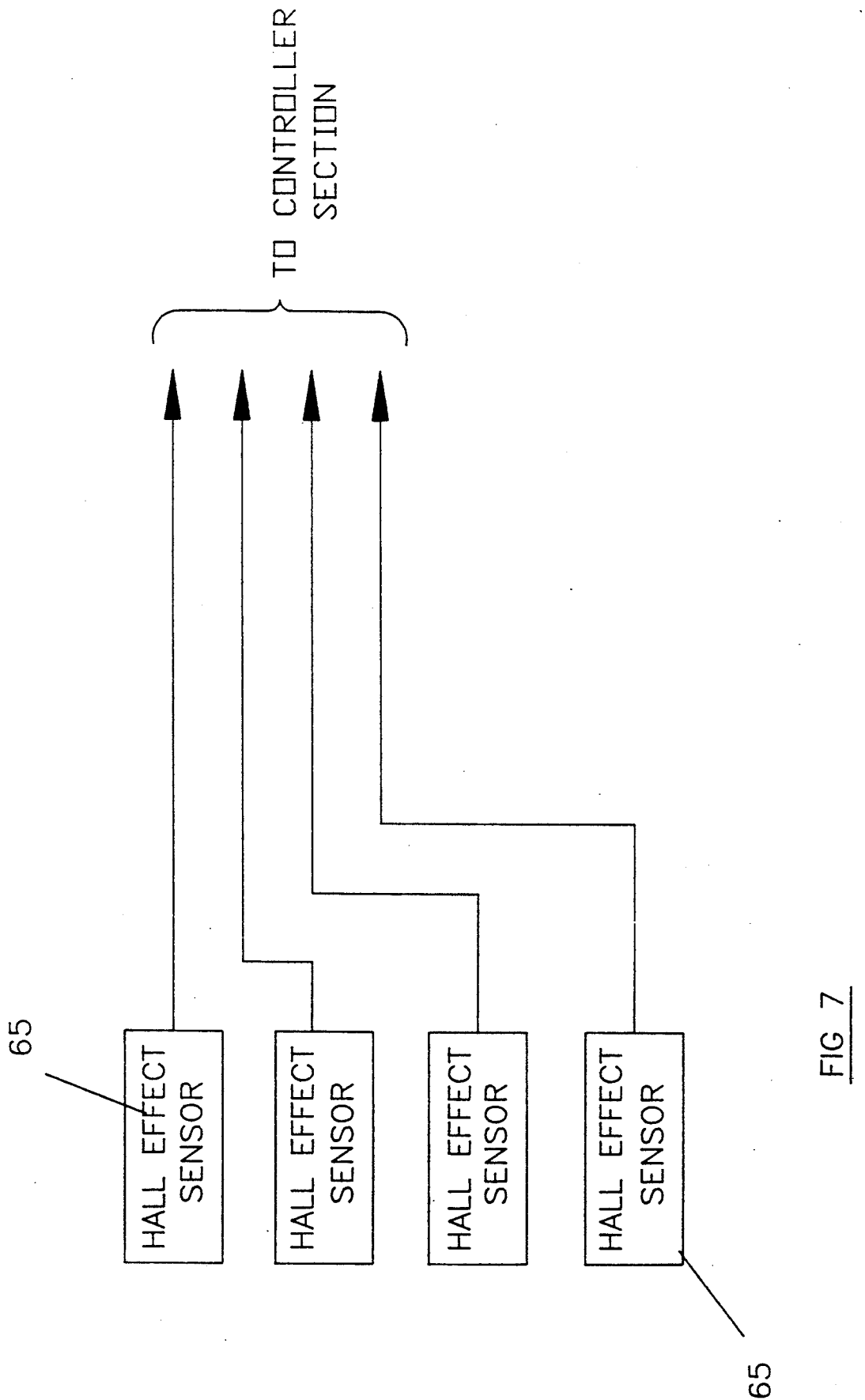
FIG. 7 is an illustrative block diagram showing components of the sensor section of the motor control system shown in FIG. 6.

As seen in FIG. 7, sensor section 60 for detecting velocity and rotor/stator position of the motor during operation contain sensor means, such as four Sprague UGN 3135 U, latched, Hall effect sensors, and four Allen-Bradley RC07GF332J 3.3 KOHM, ¼ watt resistors for pulling up the open collector output of the sensors. As described, these sensors sense the passage of the alternating North and South poles of the two ring magnets 50, 52 attached to the rotor. One set of two Hall effect sensors in 30° arcuately spaced pockets 55 (one pocket seen in FIG. 2a) sense passage of equal length North and South poles of a 60 pole ring magnet 50 to provide a 120 line quadrature encoder for motor velocity control. The second set of Hall effect sensors 57, 58 (FIGS. 4 and 5) in pockets 56 sense the North and South poles of magnet 52 to provide signals for commutation.

Figure 8:
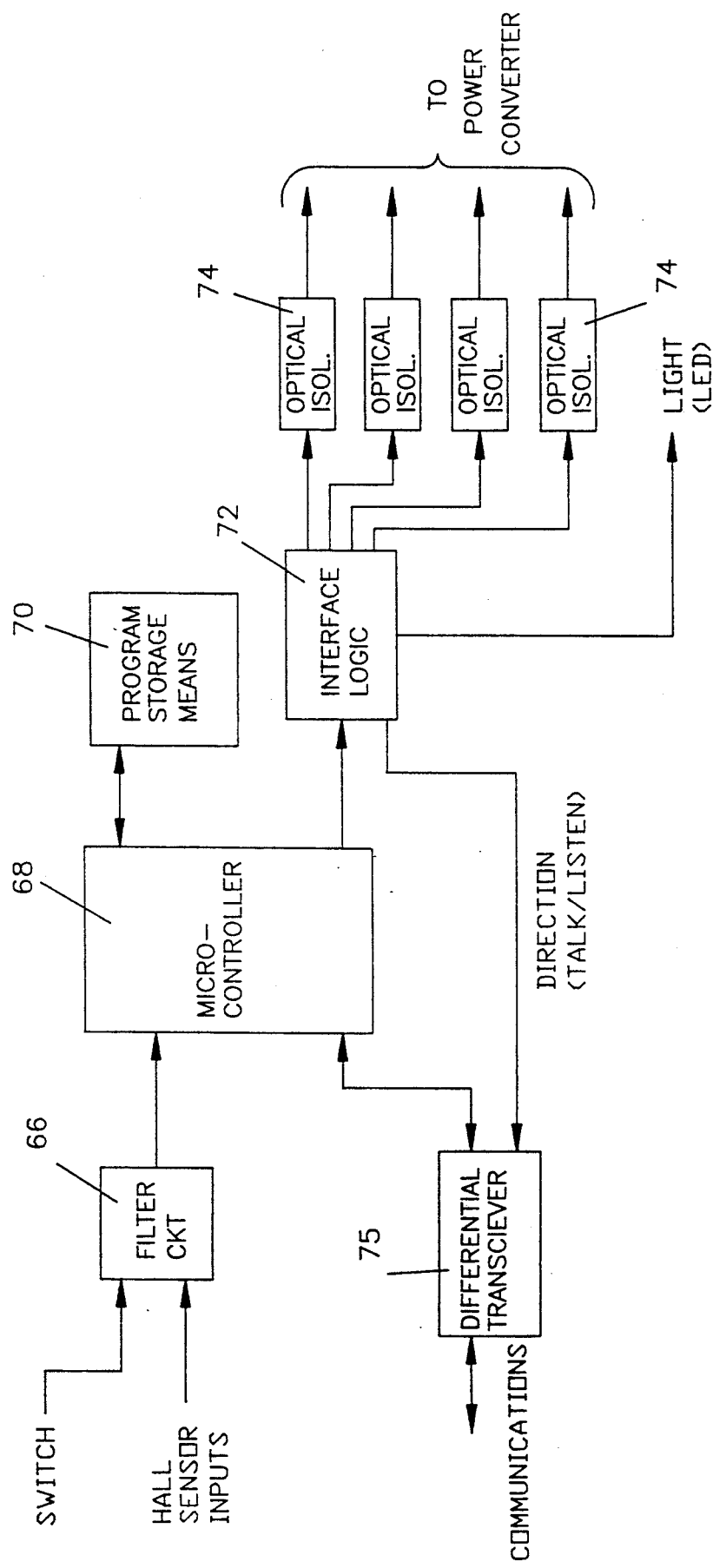
FIG. 8 is an illustrative block diagram showing components of the controller section of the motor control system shown in FIG. 6.

Controller section 62 components, as seen in FIG. 8, include a filter circuit 66 for receiving input signals from the sensor section 60, and for transmitting such signals, after filtering, to a microcontroller 68 which processess and executes a control program supplied thereto from program storage means 70, such as a ROM or EPROM. Process information from microcontroller 68 is processed through an interface logic component 72 and transmitted via optical isolators 74 to power converter section 64 of the control system.

Controller section 62 contains the circuits which perform velocity control, input, output, and commutation functions. Typically the filter circuit 66 in this section may comprise four Kemet C315C103M5U5CA 0.01 uF 50 Volt radial lead ceramic capacitors for filtering the incoming Hall effect sensor signals, and a National Semiconductor 74HC14N Hex Schmitt Triggered Inverter for sharpening the edges of the filtered signals from the Hall effect sensors and the output signal from a manual off/on switch 63 (FIG. 1) of the motor 20, such as an ITT-Schadow D602-01 momentary single-pole-single-throw (normally open) push-button switch. The Schmitt Triggered Inverter also buffers the control signal for an indicator light 65 (FIG. 1), such as a Light Emitting Diode.

Microcontroller 68 may be an Intel N80C194 16 bit, 12 MHz microcontroller processor which executes the control program stored in storage means 70, which may be an Intel N87C257-170V10 latched EPROM.

In the interface logic 72, a National Semiconductor 74HC08N quad AND gate provides multiplexing and interface functions for the output signals from the microcontroller to the four optical isolators 74, which may be Motorola MOC5008 optical isolators. A National Semiconductor 74HC174N hex D flip flop is connected to the multiplexed address/data bus of the microcontroller 68 in order to latch outputs which control a differential transceiver 76, which may be a National Semiconductor UA 96176 RS-485 transceiver, and the LED 65. Three Allen-Bradley RC07GF332J 10 KOhm ¼ Watt resistors are used to pull up two unused high impedance inputs and to bias the receive data line to a logical one. A Kemet T350B685MO10AS 6.8 uF tantalum 20 Volt radial lead capacitor is used to provide the power-up reset RC time constant. Two Kemet C315C330K2G5CA 33 pF ultra-stable ceramic 200 Volt radial lead capacitors are used in conjunction with a 12.000 MHz crystal to form the oscillator circuit providing the 12 MHz timebase for the microcontroller. An Allen-Bradley RC07GF121J 120 Ohm ¼ watt resistor is used to terminate the differential pair communications line. Eight Kemet C315C104M5U 5CA 0.1 uF 50 Volt ceramic radial lead capacitors, one Kemet T350A105M020AS1 uF tantalum 20 volt radial lead capacitor and one Kemet T350F336M010AS 33 uF tantalum radial lead capacitor are used for general decoupling throughout the controller circuit to minimize noise transients.

Figure 9:
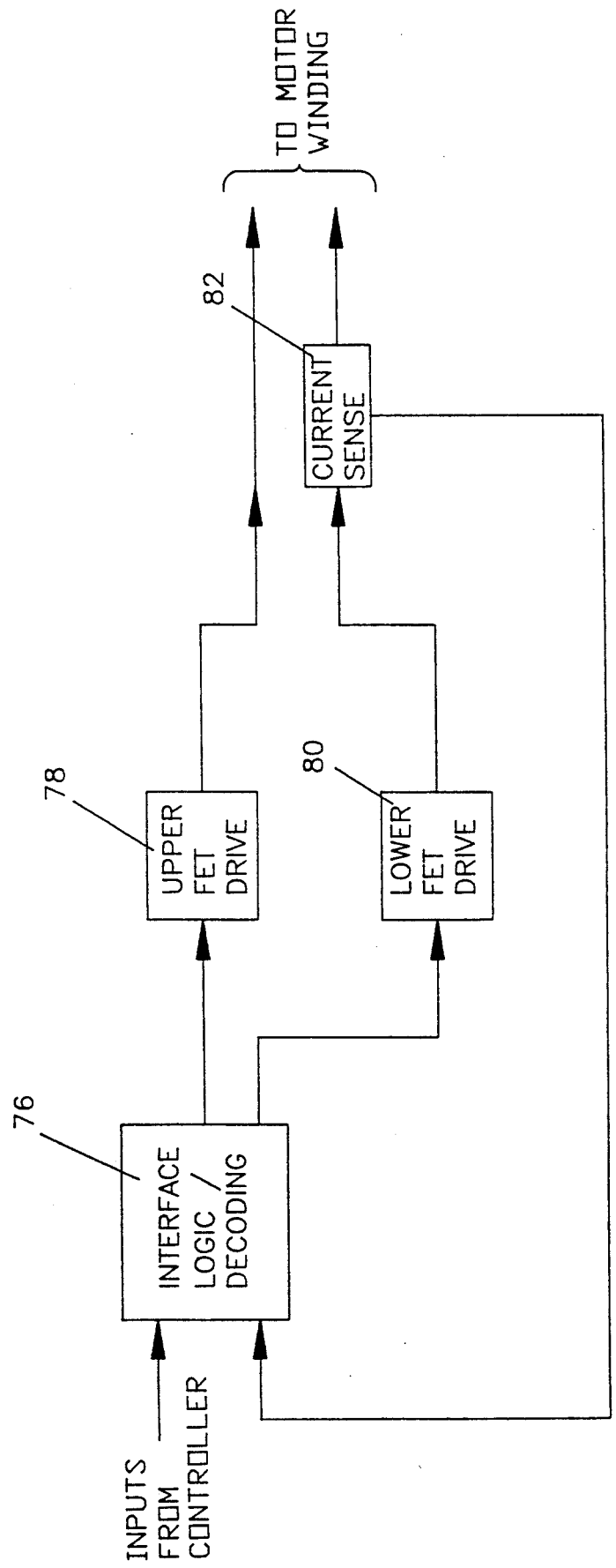
FIG. 9 is an illustrative block diagram showing components of the power converter section of the motor control system shown in FIG. 6.
Figure 10:
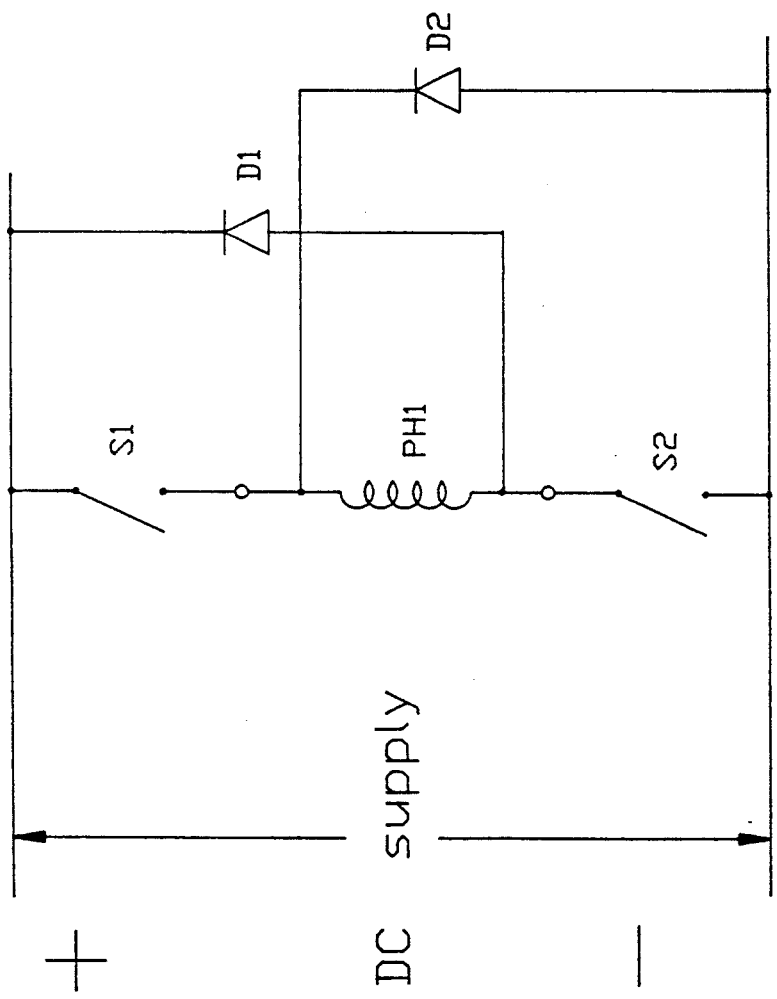
FIG. 10 is an electrical schematic diagram of one of the switch means components of the power converter section of the motor control system showing the switch arrangement for supplying current to one phase winding of the spindle assembly drive motor.

As shown in FIG. 9, inputs from the four optical isolators 74 of the controller section 62 pass through an interface logic/decoder 76 of the power converter section 64 to upper and lower motor winding switch means 78, 80, which may consist of a plurality of field effect transistors each having an associated circuit for turn-on and turn-off. Operation of the switch means supplies current to the three phase windings of VR motor 20. Three of the four optically isolated signals from the controller section 62 control the motor phases directly and interface to a quad OR gate (such as a National Semiconductor 74C02N) in decoder 76 which allows the windings to be turned off in the event of over current. These phase control signals are buffered by a line driver (such as a National Semiconductor 74C240N) in decoder 76 and then operate switches S1 and S2 of each phase winding circuit PH1, as illustrated in FIG. 10. These switches may be three International Rectifier IRF 730 N channel Field Effect Transistors in the lower switch means 80 and three Motorola MTP2P45 P channel FETs in the upper switch means 78 (FIG. 9).

Ultra fast recovery diodes D1, D2 (FIG. 10), such as Motorola MUR 440 diodes, are used as regeneration diodes. They allow the energy stored in the winding to be returned to the supply when the winding is turned off.

The current limit component 82 of the power converter is implemented using four operational amplifiers such as a National Semiconductor LM324N quad operational amplifier integrated circuit. In conjunction with the appropriate commercially available resistors, a voltage, which is proportional to the current in the motor windings, is compared to some reference voltage and an output signal which causes switches S1 and S2 to be turned off is generated if the current in the motor windings exceeds the maximum allowed current.

That which is claimed is:

1. A motor-driven spindle assembly for a textile ring spinning frame, said assembly comprising a support bolster for attachment to a spindle assembly support rail of a spinning frame, shaft means having one end portion mounted in said support bolster for axial rotation on a central rotational axis and the other end adapted for receipt of a yarn support bobbin, and motor means operatively attached to the shaft means to rotate the same;

said bolster including an outer housing for fixed attachment to the spindle assembly support rail, means fixed against rotation and mounted in said housing for supporting said one end portion of said shaft means for axial rotation on said central axis and for rotation about axes incrementally angularly varying from said central rotational axis during yarn spinning operations, said means fixed against rotation having an outer end portion surrounding said shaft means and extending out of said bolster housing;

said motor means comprising a multi-phase brushless DC drive motor for said shaft means having a housing mounted in fixed relation to the bolster in surrounding relation to the axis of rotation of the shaft means, a stator fixedly mounted in said motor housing in surrounding relation to the axis of rotation of the shaft means and having salient poles with phase windings thereon, a rotor mounted on said shaft means for rotation therewith, said rotor being located inside said stator and having salient poles spaced inwardly from and facing the salient poles of the stator; and means for detecting the relative positions of the rotor and stator during rotor rotation and for providing signals in response to such detection, said detecting means comprising sensed means operatively attached to the rotor for rotation therewith and sensing means fixedly mounted on said outer end portion of said means fixed against rotation and adjacent the path of movement of said sensed means for detecting the passage of the sensed means and for producing signals in response to detection of the sensed means to identify relative rotor/stator positions during operation of the motor, whereby said sensing means is correspondingly incrementally angularly displaceable with said means fixed against rotation, shaft means, and sensed means on the rotor to maintain the same radial distance between the sensing means and the sensed means during the yarn spinning operation.

2. A motor-driven spindle assembly as defined in claim 1 wherein said means fixed against rotation in said bolster housing comprises sleeve means having a lower end portion attached to said bolster housing and an upper end portion extending upwardly therefrom to receive said shaft means for axial rotation therein, a support ring surrounding the outer end portion of said sleeve means and fixed thereto against rotation, said support ring including a plurality of pockets therein mounted in arcuately spaced relation about the ring and adjacent the path of movement of said sensed means, each pocket being adapted to receive one of said sensing means in fixed position relative to the path of movement of said sensed means during the yarn spinning operation.

3. A motor-driven spindle assembly as defined in claim 2 wherein said sensed means comprise at least one magnetic ring having alternating North and South pole arcuate segments and supportably attached to the rotor for rotation therewith, and said sensing means comprises a plurality of Hall effect sensors mounted in said support ring pockets for detecting the passage of said alternating North and South pole segments during rotation of the rotor.

4. A motor-driven spindle assembly as defined in claim 2 wherein said sleeve means has a flattened outer peripheral surface portion and said support ring has a flattened inner peripheral surface portion located in mating engagement to fix the support ring against rotational movement about said sleeve means.

5. A motor-driven spindle assembly as defined in claim 2 wherein said support ring pockets for receipt of said sensing means are positioned radially inwardly of the path of movement of said sensed means with respect to the axis of rotation of said shaft means.

* * * * *